United States Patent
Negi et al.

(10) Patent No.: US 10,764,439 B1
(45) Date of Patent: Sep. 1, 2020

(54) AUTO LEARNING SYSTEM FOR ACTIVE CO-BROWSE SESSIONS

(71) Applicant: Avaya Inc., Santa Clara, CA (US)

(72) Inventors: Manish Negi, Pune (IN); Rajashri Bhor, Pune (MH); Saumabha Pal, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/372,155

(22) Filed: Apr. 1, 2019

(51) Int. Cl.
| | |
|---|---|
| *H04M 3/51* | (2006.01) |
| *H04L 29/08* | (2006.01) |
| *H04M 3/42* | (2006.01) |
| *G10L 15/08* | (2006.01) |
| *G06F 3/0482* | (2013.01) |
| *G06F 3/0486* | (2013.01) |
| *G06F 3/0481* | (2013.01) |

(52) U.S. Cl.
CPC .......... *H04M 3/5191* (2013.01); *G10L 15/08* (2013.01); *H04L 67/02* (2013.01); *H04L 67/141* (2013.01); *H04M 3/42221* (2013.01); *H04M 3/5133* (2013.01); *G06F 3/0482* (2013.01); *G06F 3/0486* (2013.01); *G06F 3/04812* (2013.01); *G10L 2015/088* (2013.01); *H04M 2201/40* (2013.01)

(58) Field of Classification Search
CPC .. G06F 3/04812; G06F 3/0482; G06F 3/0484; G06F 3/0486; G06F 11/36; G06F 15/16; G06Q 10/06; G06Q 30/00; G06Q 30/06; G06T 19/00; G10L 15/08; G10L 2015/088; H04L 29/06; H04L 29/08; H04L 67/02; H04L 67/141; H04M 3/51; H04M 3/5133; H04M 3/5191; H04M 3/42221; H04M 2201/40; H04M 3/42
See application file for complete search history.

(56) References Cited

U.S. PATENT DOCUMENTS

| | | | |
|---|---|---|---|
| 9,123,019 B1* | 9/2015 | Roy | G06Q 10/10 |
| 9,171,182 B2 | 10/2015 | Shukla et al. | |
| 9,888,074 B1* | 2/2018 | Roy | G06Q 10/10 |
| 1,006,997 A1 | 9/2018 | Skiba et al. | |
| 1,008,353 A1 | 9/2018 | Moore et al. | |
| 10,237,325 B2* | 3/2019 | Badge | H04L 65/403 |
| 10,291,722 B1* | 5/2019 | Mendez | H04L 65/1069 |
| 2003/0061286 A1* | 3/2003 | Lin | H04L 69/329 |
| | | | 709/205 |

(Continued)

*Primary Examiner* — Gerald Gauthier
(74) *Attorney, Agent, or Firm* — Sheridan Ross P.C.

(57) ABSTRACT

A co-browsing session between a customer communication endpoint and an agent terminal is established. User input is received, via at least one of the customer communication endpoint and the agent terminal, in the co-browsing session, which identifies a field that is difficult to understand. For example, the contact center agent may provide input that the customer does not understand a terms of use field. Information associated with the identified field that is difficult to understand is stored in a memory. The stored information is used to generate a report for the identified field. The report is then used to identify ways that may make the field more understandable by future customers. In one embodiment, the customer may also be able to mask one or more fields so that the contact center agent cannot view information in the field. For example, the customer may mask a social security number field.

20 Claims, 9 Drawing Sheets

(56) References Cited

U.S. PATENT DOCUMENTS

| | | | | |
|---|---|---|---|---|
| 2005/0010781 | A1* | 1/2005 | Harper | G16H 40/20 |
| | | | | 713/182 |
| 2005/0108330 | A1* | 5/2005 | Sakaguchi | H04L 69/329 |
| | | | | 709/205 |
| 2006/0053380 | A1* | 3/2006 | Spataro | G06F 16/93 |
| | | | | 715/753 |
| 2007/0116239 | A1* | 5/2007 | Jacobi | H04M 7/003 |
| | | | | 379/265.02 |
| 2008/0052377 | A1* | 2/2008 | Light | H04L 67/02 |
| | | | | 709/218 |
| 2009/0164935 | A1* | 6/2009 | Feigenbaum | G06F 3/04895 |
| | | | | 715/780 |
| 2010/0306642 | A1* | 12/2010 | Lowet | G06F 16/954 |
| | | | | 715/234 |
| 2011/0191676 | A1* | 8/2011 | Guttman | G06F 3/00 |
| | | | | 715/716 |
| 2012/0089659 | A1* | 4/2012 | Halevi | G06F 3/04842 |
| | | | | 709/201 |
| 2014/0019888 | A1* | 1/2014 | Paniagua | G06F 3/0484 |
| | | | | 715/760 |
| 2014/0052868 | A1* | 2/2014 | Burckart | G06F 16/954 |
| | | | | 709/227 |
| 2014/0098176 | A1* | 4/2014 | Isaacs | H04W 4/60 |
| | | | | 348/14.01 |
| 2014/0129622 | A1* | 5/2014 | Michaeli | G06Q 10/10 |
| | | | | 709/203 |
| 2014/0237039 | A1* | 8/2014 | Bank | H04L 67/22 |
| | | | | 709/204 |
| 2014/0280334 | A1* | 9/2014 | LeBlanc | G06F 21/6227 |
| | | | | 707/770 |
| 2015/0106907 | A1* | 4/2015 | Chawla | G06Q 50/24 |
| | | | | 726/9 |
| 2015/0149916 | A1* | 5/2015 | Mendez | G06F 17/2247 |
| | | | | 715/738 |
| 2015/0262188 | A1* | 9/2015 | Franco | G06Q 30/016 |
| | | | | 705/7.21 |
| 2016/0092420 | A1* | 3/2016 | Cesena | G06F 3/0484 |
| | | | | 715/759 |
| 2016/0110280 | A1* | 4/2016 | Singh | G06F 3/04842 |
| | | | | 715/762 |
| 2016/0212184 | A1* | 7/2016 | Halevi | H04L 65/403 |
| 2016/0323449 | A1* | 11/2016 | Drotos | G06Q 40/025 |
| 2017/0013073 | A1* | 1/2017 | Mendez | H04L 67/22 |
| 2017/0090853 | A1* | 3/2017 | Khalatian | G06Q 10/101 |
| 2018/0063325 | A1* | 3/2018 | Wilcox | H04M 3/5183 |
| 2018/0150781 | A1* | 5/2018 | Chandra | G06Q 10/06313 |
| 2018/0219849 | A1* | 8/2018 | Jones | H04L 63/083 |
| 2018/0300787 | A1* | 10/2018 | Patterson | G06Q 30/0625 |
| 2019/0095320 | A1* | 3/2019 | Biswas | G06F 11/3688 |
| 2019/0114647 | A1* | 4/2019 | Pond | H04N 7/147 |
| 2019/0171340 | A1* | 6/2019 | Anand | G06F 16/904 |
| 2019/0287307 | A1* | 9/2019 | Rogers | G06Q 20/145 |

* cited by examiner

AUTO LEARNING SYSTEM FOR ACTIVE CO-BROWSE SESSIONS

FIELD

The disclosure relates generally to co-browsing sessions and particularly to automatic learning of identified problems in a co-browsing session.

BACKGROUND

In current co-browsing webpage solutions, a customer may require assistance regarding specific webpage fields from a contact center agent. In addition, the customer may desire additional information about the webpage fields from the contact center agent. In the current co-browsing contact center solutions, there are no systems that provide auto-learning for webpage fields assisted by the contact center agent during an active call.

In addition, the customer may not want the contact center agent to see certain fields (or have the fields captured by the contact center) during a co-browsing session. When the contact center agent enables a co-browsing session, all the webpage fields are displayed to the contact center agent, regardless of whether the customer wants the contact center agent to be able to see every webpage field.

SUMMARY

These and other needs are addressed by the various embodiments and configurations of the present disclosure. A co-browsing session between a customer communication endpoint and an agent terminal is established. User input (e.g., an annotation) is received, via at least one of the customer communication endpoint and the agent terminal, in the co-browsing session, which identifies a field that is difficult to understand. For example, the contact center agent may provide input that the customer does not understand a terms of use field. Information associated with the identified field that is difficult to understand is stored in a memory. The stored information is used to generate a report for the identified field. The report is then used to identify ways that may make the field more understandable by future customers. For example, the report may indicate that specific training of specific contact center agents needs to be done to better address customer's needs.

In one embodiment, the customer may also be able to mask one or more fields so that the contact center agent cannot view information in the field. For example, the customer may mask a social security number field. In addition, any information in the fields that a customer has masked may be prevented from being stored by the contact center.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof Further, the structures, materials or acts and the equivalents thereof shall include all those described in the summary, brief description of the drawings, detailed description, abstract, and claims themselves.

As defined herein and in the claims, the term "customer" can be or may include any user or entity that can interact with a contact center agent in a co-browsing session.

As defined herein and in the claims, the term "co-browsing session" is a type of communication session where both a customer and a contact center can view the same web page(s), user interface(s), and/or the like.

As described herein and in the claims, the term "field" can be or may include a text field, a menu item, a button, an icon, a slider, a cursor, a scroll bar, a tab, a window, any kind of graphical element, an audio element that is played in a co-browsing session, a vibration during a co-browsing session, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 2 is a first diagram of a user interface for identifying fields that are difficult to understand in a co-browsing session.

FIG. 3 is a diagram of a user interface for identifying fields that are difficult to understand in different windows of a co-browsing session.

DETAILED DESCRIPTION

Figure 1:
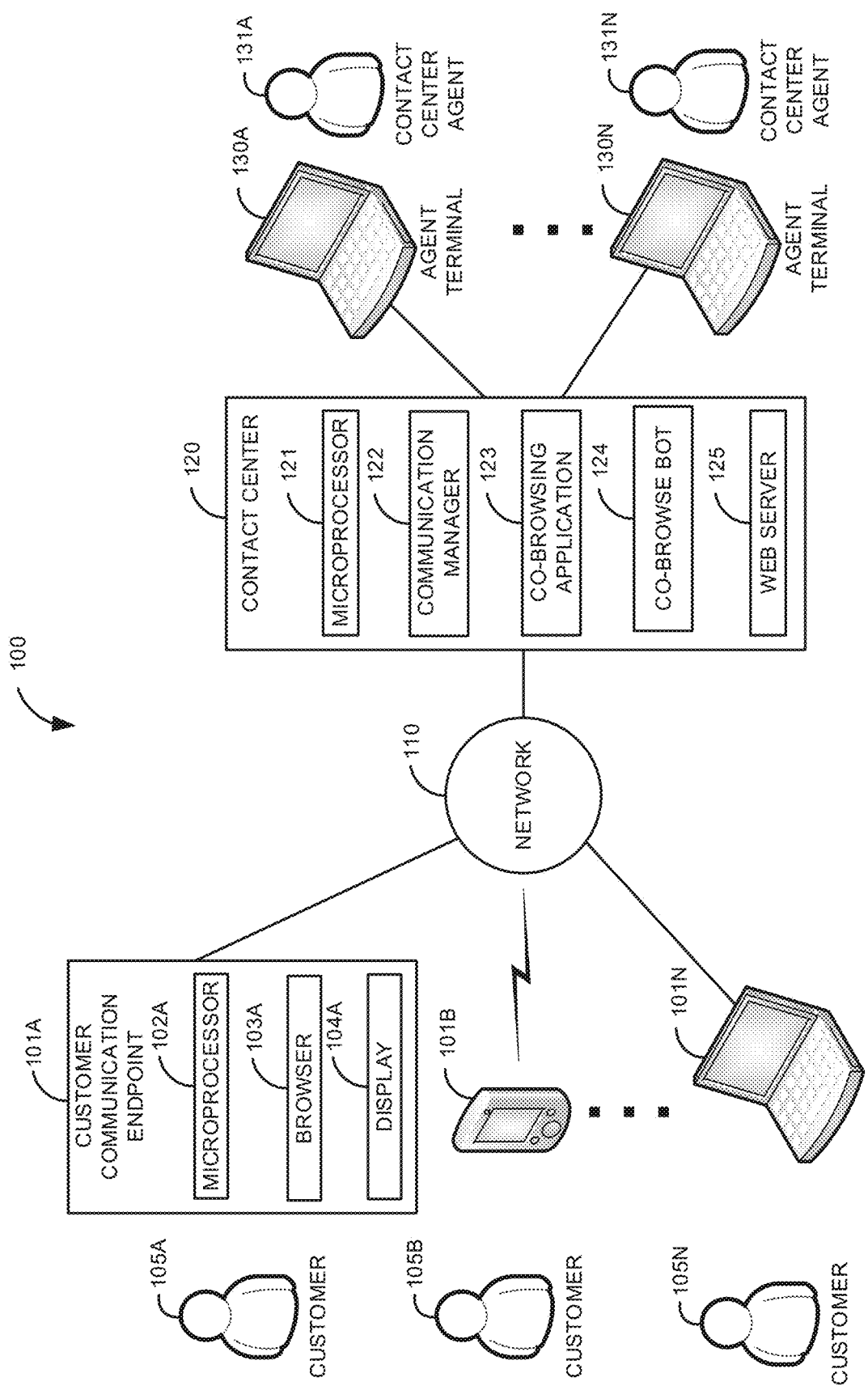
FIG. 1 is a block diagram of a first illustrative system for identifying fields that are difficult to understand in a co-browsing session.

FIG. 1 is a block diagram of a first illustrative system 100 for identifying fields that are difficult to understand in a co-browsing session. The first illustrative system 100 comprises customer communication endpoints 101A-101N, a network 110, a contact center 120, and agent terminals 130A-130N. In addition, FIG. 1 shows customers 105A-105N associated with the customer communication endpoints 101A-101N. FIG. 1 also shows contact center agents 131A-131N associated with the agent terminals 130A-130N.

The customer communication endpoints 101A-101N can be or may include any user communication endpoint device that can communicate on the network 110, such as a Personal Computer (PC), a telephone, a video system, a conferencing system, a cellular telephone, a Personal Digital Assistant (PDA), a tablet device, a notebook device, a smartphone, a laptop device, and the like. The customer communication endpoints 101A-101N are devices where a communication session ends. The communication endpoints 101A-101N are not network elements that facilitate and/or relay a communication session in the network, such as a communication manager 122 or router. As shown in FIG. 1, any number of customer communication endpoints 101A-101N may be connected to the network 110.

The customer communication endpoint 101A further comprises a microprocessor 102A, a browser 103A, and a display 104A. The microprocessor 102A can be any type of hardware microprocessor, such as, an application specific processor, a multi-core processor, a microcontroller, a digital signaling processor, and/or the like.

The browser 103A can be or may include any known browser, such as, Google Chrome™, Microsoft Internet Explorer™, Firefox™, Safari™, and/or the like. In one embodiment, the browser 103A may include a co-browsing snap-in (not shown).

The display 104A can be or may include any hardware display, such as, a plasma display, a Light Emitting Diode (LED) display, a liquid crystal display, a cathode ray tube, a projector, and/or the like. The display 104A is used to display a co-browsing session.

Although not shown for convenience, the customer communication endpoints 101B-101N also comprise the microprocessor 102, the browser 103, and the display 104. In addition, the customer communication endpoints 101A-101N may comprise other elements, such as, a user input/output, memory, applications, an operating system, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Web Real-Time Communication (WebRTC) protocol, H.323, video protocols, Instant Messaging (IM) protocols, email protocols, text messaging protocols, and/or the like. Thus, the network 110 is an electronic communication network configured to carry messages via packets and/or circuit switched communications.

The contact center 120 can be or may include any hardware coupled with software that can manage communications between the customers 105A-105N and the contact center agents 131A-131N. The contact center 120 further comprises a microprocessor 121, a communication manager 122, a co-browsing application 123, a co-browsing bot 124, and a web server 125. Although not shown, the contact center 120 may include other elements, such as, a contact center queue, and interactive voice response system, and/or the like.

The microprocessor 121 can be any type of hardware microprocessor, such as, an application specific processor, a multi-core processor, a microcontroller, a digital signaling processor, and/or the like.

The communication manager 122 can be or may include any hardware/software that can manage and route communications in the contact center 120, such as, a Private Branch Exchange (PBX), a switch, a router, a proxy server, a session manager, and/or the like. The communication manager 122 may establish various types of communication sessions, such as, co-browsing, multi-media, voice, video, IM, chat, text messaging, email, and/or the like.

The co-browsing application 123 can be or may include any software application that can manage a co-browsing session between a customer 105 (at a customer communication endpoint 101) and a contact center agent 131 (at an agent terminal 130). In FIG. 1, the co-browsing application 123 is only shown in the contact center 120. However, in other embodiments, the co-browsing application 123 may be distributed between the contact center 120 and the customer communication endpoints 101A-101N (e.g., in a browser 103 snap-in or installed application).

The co-browse bot 124 can be or may include any robot that can automatically monitor one or more co-browsing sessions. For example, the co-browse bot 124 may monitor multiple co-browsing sessions to generate contact center agent scripts.

The web server 125 can be or may include any known web servers, such as Apache™, Microsoft's Internet Information Server™, nginx™, and/or the like. The web server 125 supports the ability to have a co-browsing session.

The agent terminals 130A-130N can be or may include any communication device that a contact center agent 131A-131N can use to support a co-browsing session, such as a desktop computer, a laptop computer, a mobile device, a tablet device, a smart phone, and/or the like.

Figure 2:
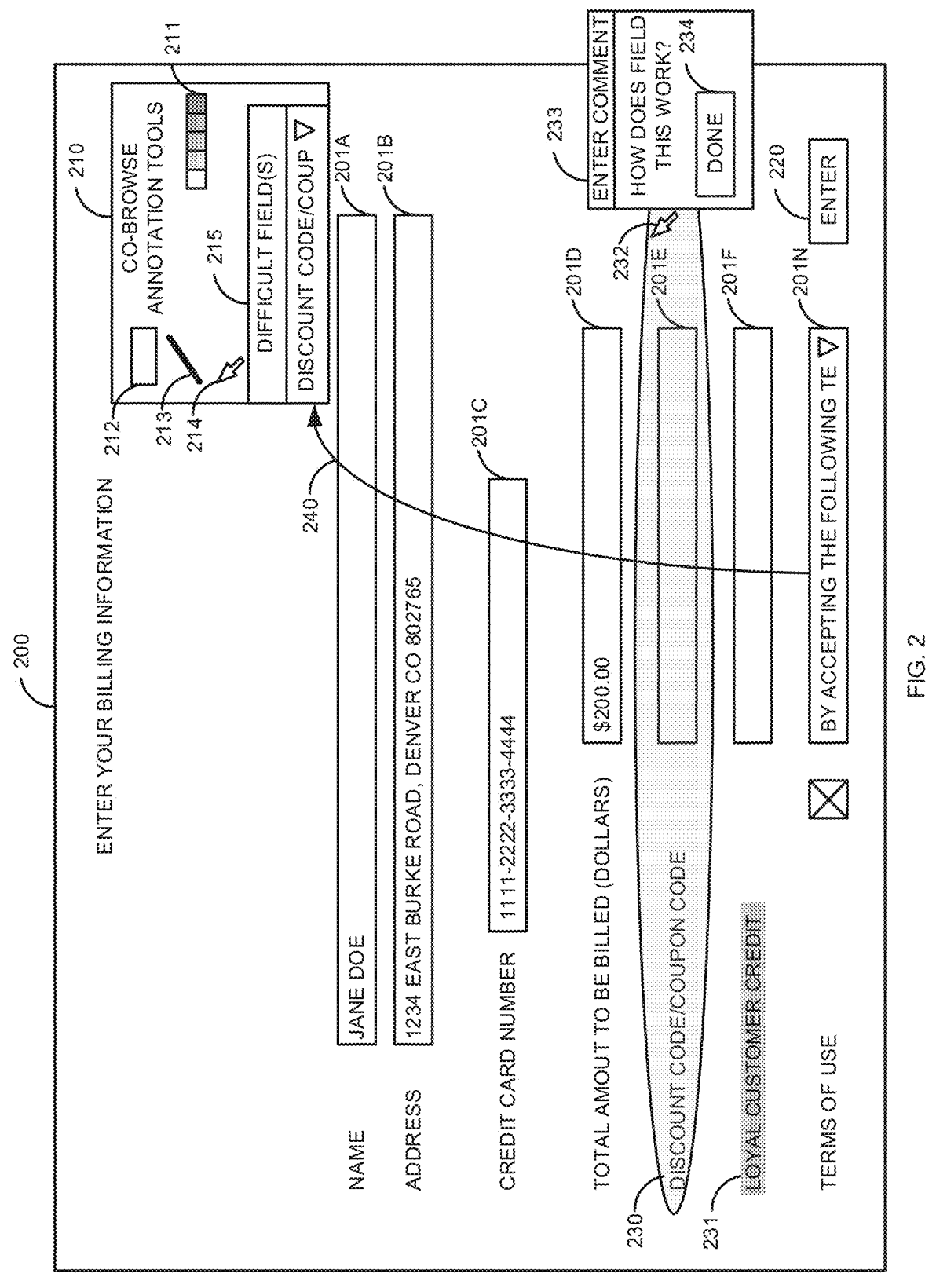

FIG. 2 is a first diagram of a user interface 200 for identifying fields 201 that are difficult to understand in a co-browsing session. Illustratively, the customer communication endpoints 101A-101N, the browser 103A, the contact center 120, the communication manager 122, the co-browsing application 123, the co-browse bot 124, the web server 125, and the agent terminals 130A-130N are stored-program-controlled entities, such as a computer or microprocessor 102/121, which performs the method of FIGS. 2-9 and the processes described herein by executing program instructions stored in a computer readable storage medium, such as a memory (i.e., a computer memory, a hard disk, and/or the like). Although the methods described in FIGS. 2-9 are shown in a specific order, one of skill in the art would recognize that the steps in FIGS. 2-9 may be implemented in different orders and/or be implemented in a multi-threaded environment. Moreover, various steps may be omitted or added based on implementation.

The user interface 200 is an exemplary example of a co-browsing session between the customer 105A and the contact center agent 131A. FIG. 2 is a view of the co-browsing session that is displayed to the customer 105A on the customer communication endpoint 101A in the display 104A (a similar user interface 200 is displayed to the contact center agent 131A). The user interface 200 is used by the customer 105A to identify any field(s) 201A-201N that the customer 105A does not understand or needs further explanation by the contact center agent 131A. For example, the customer 105A may need further explanation, by the contact center agent 131A, of the loyal customer credit field 201F. When a field 201 is identified that is difficult for the customer 105A to understand, the customer 105A (or the contact center agent 131A) can annotate the field 201. The annotated fields 201 are used to generate a report of ways the user interface 200 can be improved.

The user interface 200 comprises fields 201A-201N, a co-browse annotation tool window 210, an enter button 220, a cursor 232, and a comment window 233. The name field 201A is where the customer 105A enters his/her name. The address field 201B is where the customer 105A enters his/her address. The credit card number field 201C is where the customer 105A enters his/her credit card number. The total amount to be billed field 201D displays the amount the customer 105A is to pay. For example, for the total amount to be billed field may be derived from a cost of merchandise in virtual shopping cart. The discount code/coupon code field 201E is where the customer 105A enters a discount code/coupon code. The loyal customer credit field 201F is where the customer 105A enters a code to get a credit. The terms of use field 201N is where the customer 105A reads the terms that bind the purchase.

The co-browse annotation tool window 210 comprises a color selection bar 211, a box annotation tool 212, a brush annotation tool 213, a cursor annotation tool 214, and a difficult field(s) drop-down menu 215. The color selection bar 211 allows the customer 105A to select a color to be used for annotations. The box annotation tool 212, when selected by the customer 105A, allows the customer 105A to draw a box using the cursor 232 to annotate a field 201. The brush annotation tool 213, when selected by the customer 105A, allows the customer 105A use a cursor 232 like a brush to annotate a field 201. The cursor annotation tool 214, when selected by the customer 105A, allows the customer 105A to select a text field 201 (e.g., by double clicking on a field) to annotate the text field. The difficult field(s) drop-down menu 215 displays a list of one or more fields 201A-201N that the customer 105A has annotated. In FIG. 2, the customer may use any of the annotation tools 212-214 to select one or more fields 201A-201N.

As shown in FIG. 2, the customer 105A has drawn an oval circle, using the brush annotation tool 213, to annotate the discount code/coupon code field 201E. The annotation results in the discount code/coupon code field 201E being displayed in the difficult field(s) drop-down menu 215. The customer 105A has also annotated the loyal customer credit field 201F using the cursor annotation tool 214. Although not shown, the loyal customer credit field 201F will also be shown in the difficult field(s) drop-down-menu 215 (i.e., when selected to drop-down by the customer 105A). The customer 105A may also annotate (select) a field 201 by dragging-and-dropping the field 201. For example, as shown in step 240, the customer 105A has dragged-and-dropped the terms of use field 201N into the difficult field(s) drop-down menu 215. Although not shown, the terms of use field 201N will also be shown in the difficult field(s) drop-down-menu 215 (i.e., when selected to drop-down by the customer 105A) based on the drag-and-drop step 240. When the customer 105A drags-and-drops a field 201 into the difficult field(s) drop-down menu 215, the field 201 may be automatically annotated (e.g., highlighted) in the user interface 200.

The customer 105A may also enter a comment associated with an annotated field 201. For example, as shown in FIG. 2, the customer 105A has positioned the cursor 232 over the annotated discount code/coupon code field 201E and then has right clicked a mouse to display (or select for display) the comment window 233. The customer 105A can then enter a comment and then select the done button 234 to store the comment with information associated with the annotated discount code/coupon code field 201E.

When the customer 105A selects the enter button 220, the annotations and any information associated with the annotations (e.g., comments, audio and/or chat conversations) are stored. The stored information is then used to generate a report (e.g., as described in FIG. 6, step 604). In addition, the stored information may be used by an Artificial Intelligence (AI) module (not shown) to automatically modify a field 201 over time. For example, the AI module may automatically change the name of a field 201 over time based on various comments.

Figure 3:
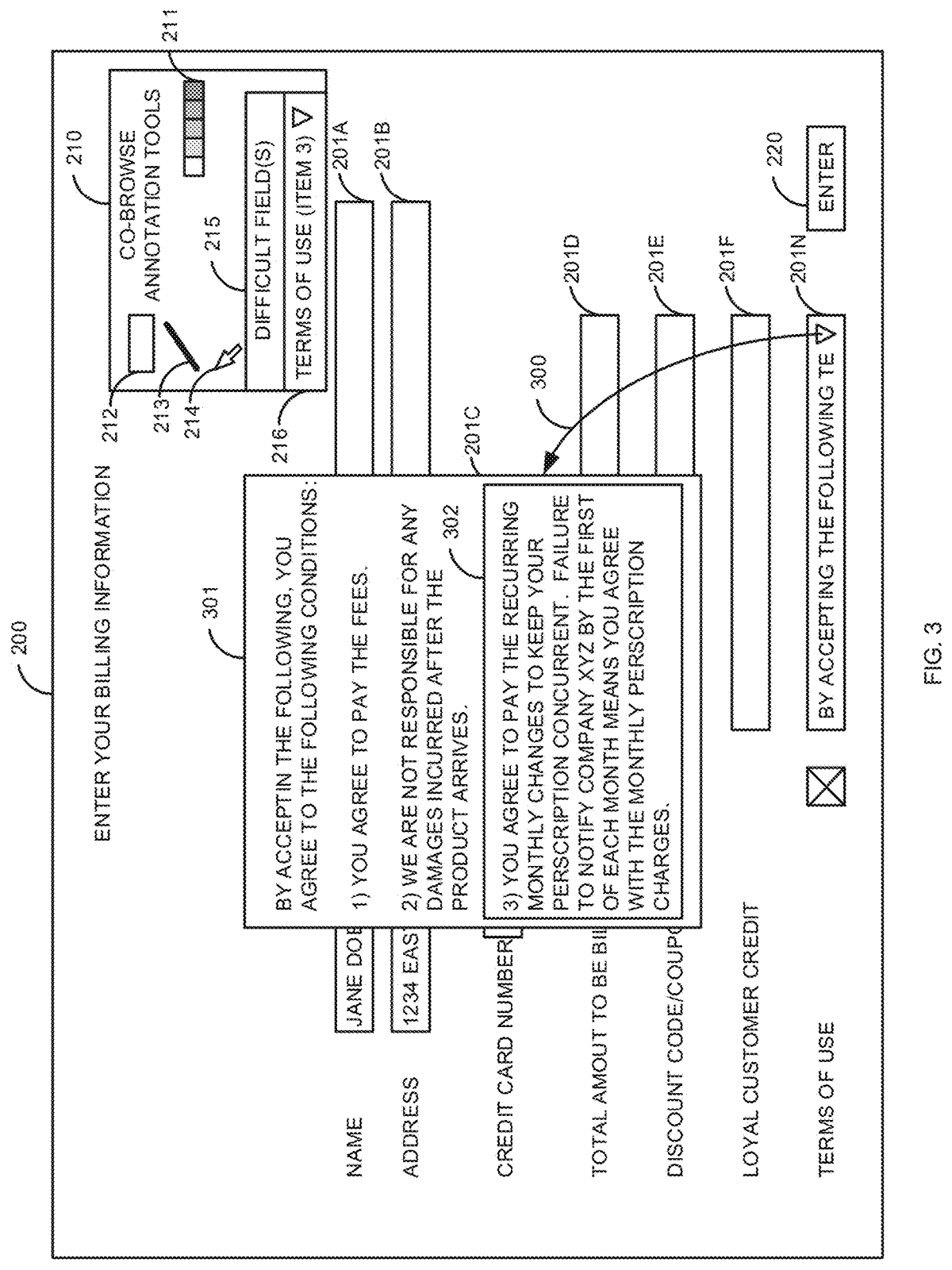

FIG. 3 is a diagram of a user interface 200 for identifying fields 201 that are difficult to understand in different windows of a co-browsing session. FIG. 3 shows the same user interface 200 as in FIG. 2 (without the annotations) with the addition of a terms of use window 301 being displayed. The customer 105A selected a drop-down-menu of the terms of use field 201N, in step 300, to display the full terms of use in the terms of use window 301. The customer 105A has annotated the third term of use as shown by the annotation 302. In this example, the customer 105A has annotated the third term of use by using the box annotation tool 212. FIG. 3 is a way the customer 105A can make annotations in different windows/web pages. In addition, as shown in FIG. 3, the customer 105A may annotate a portion of a field 201 (e.g., a portion of the terms of use field 201N).

In FIGS. 2-3, a field 201 may be type of graphical user interface element, such as a button, an icon, a menu, a pane, a picture, and/or the like. The customer 105A can also annotate a played movie or a displayed picture. For example, the customer 105A may annotate a move or picture by drawing a box around the displayed movie or picture. In this example, the actual time the annotation occurred during the movie may be captured to better identify where in the movie that the customer 105A has difficulty understating the movie.

In addition, the customer 105A may annotate an audio element/vibration element. For example, when a voice message/vibration is played during the co-browse session, a recording icon/vibrate icon may be temporarily displayed in the user interface 200. When the recording icon/vibrate icon is displayed, the customer 105A may then annotate the displayed icon (a type of field 201) in a similar manner as described in FIGS. 2-3.

In addition, the customer 105A may select a recording/vibration by using a voice command. For example, the customer 105A may say "I don't understand a specific element of a recording played during the co-browse session. Please mark this element as not being understood." This way a customer 105A may identify a specific portion of the recording/vibration (e.g., a vibration pattern) that is played during the co-browsing session.

Figure 4:
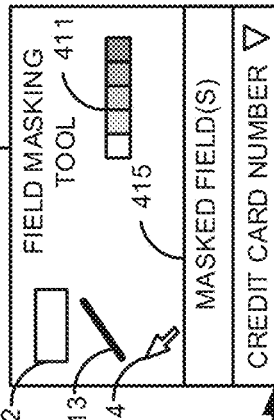
FIG. 4 is a diagram of a user interface for masking fields in a co-browsing session.

FIG. 4 is a diagram of a user interface 400 for masking fields 201 in a co-browsing session. FIG. 4 is shown from the customer's perspective on a customer communication endpoint 101. The user interface 400 includes the fields 201A-201N and the enter button 220. FIG. 4 includes a field masking tool window 410. The field masking tool window 410 comprises a color selection bar 411, a box mask tool 412, a brush mask tool 413, a cursor mask tool 414, and a masked field(s) drop-down menu 415. The color selection bar 411 allows the customer 105A to select a color to be used for masking a field 201. The box mask tool 412, when selected by the customer 105A, allows the customer 105A to draw a box to select a field 201 to mask using the cursor 420. The brush mask tool 413, when selected by the customer 105A, allows the customer 105A use a cursor 400 like a brush to select a field 201 to mask. The cursor mask tool 414, when selected by the customer 105A, allows the customer 105A to select a field 201 (e.g., by double clicking on a field 201) to annotate the field 201. The masked field(s) drop-down menu 415 displays a list of one or more fields 201A-201N that the customer 105A wants masked.

In FIG. 4, the customer 105A has selected the box mask tool 412 and drawn a box around the credit card number field 201C. This results in the credit card number field 201C being displayed in the masked field(s) drop-down menu 415. In addition, the customer 105A, as shown in step 420, may drag-and-drop a field 201 (e.g., the address field 201B as shown in FIG. 4) into the masked field(s) drop-down menu 415. Although not shown, this results in the address field 201B being added to the masked field(s) drop-down menu 415. The customer then selects the enter button 220 to save the masked fields 201.

The process described in FIG. 4 is typically done dynamically by the customer 105A before the co-browsing session starts (versus the prior art where the masked fields 201 are statically defined for all users). However, the customer 105A may dynamically mask a field 201 after the co-browsing session has started.

Figure 5:
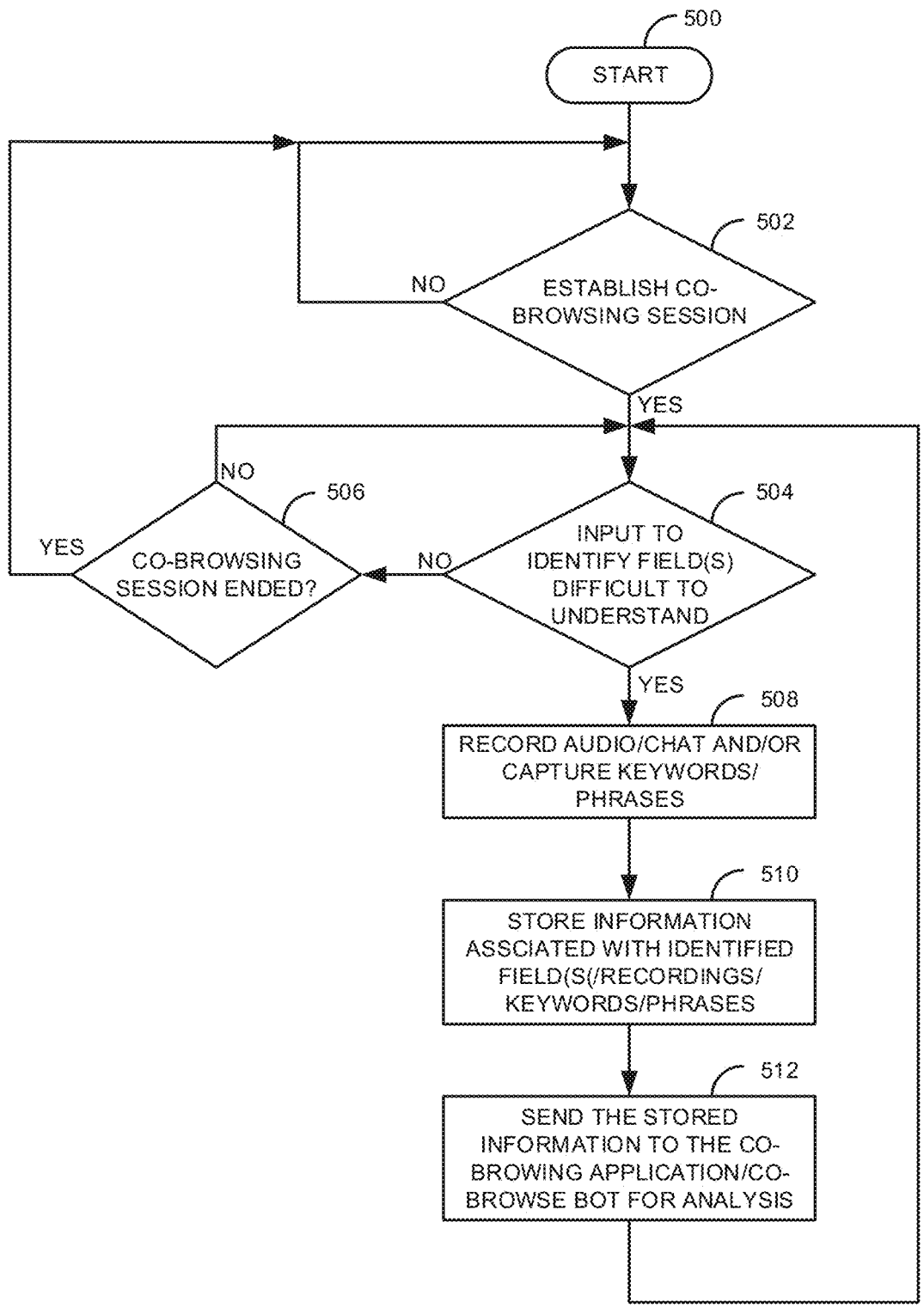
FIG. 5 is a flow diagram of a process for capturing fields that are difficult to understand in a co-browsing session.

FIG. 5 is a flow diagram of a process for capturing fields 201 that are difficult to understand in a co-browsing session. The process starts in step 500. The communication manager 122 determines, in step 502, if a co-browsing session has been established. If a co-browsing session has not been established in step 502, the process of step 502 repeats. If a co-browsing session has been established in step 502, the co-browsing application 123 determines if the customer 105/contact center agent 131 has provided input to identify one or more fields 201 that are difficult for the customer 105 to understand in step 504. For example, as shown in FIG. 2, the customer 105 has identified the fields 201E-201N as being difficult to understand.

If the customer 105/contact center agent 131 has not identified any fields 201 that are difficult to understand in step 504, the communication manager 122 determines, in step 506, if the co-browsing session has ended. If the co-browsing session has ended in step 506, the process goes back to step 502. Otherwise, if the co-browsing session has not ended in step 506, the process goes back to step 504.

If the customer 105 has defined one or more fields 201 that are difficult to understand in step 504, the co-browsing application 123 records any audio, video, and/or chat messages associated with a conversation about with the identified field(s) 201. For example, if a voice conversation occurs during the co-browsing session about the field 201 that is difficult to understand, the voice conversation is stored. The co-browsing application 123 may record the full voice communication during the co-browsing session. Once the customer 105 identifies the field 201, the co-browsing application 123 may search through the full recording to identify a specific point (a start time and an end time) in the full recording where the conversation was about the field 201. This portion of the full recording is then captured in step 508. Likewise, if there is a chat or video call going on, the specific portion of the chat conversation/video call is captured in step 508.

In a similar manner, keywords and/or phrases associated with the identified field 201 may be captured in step 508. For example, the co-browsing application 123 may capture keywords/phrases, such as, "difficult to understand," "unclear," "recurring," and/or the like in step 508.

Information associated with the identified field(s) 201 are stored in step 510. For example, the name of the field, a time when the field 201 was identified, the customer's name, the contact center agent's name, any entered comments (e.g., from the comment window 233), and/or the like are stored in step 510. In addition, the recorded voice, video, chat, and/or keywords/phrases associated with the field 201 are stored in step 510.

In addition, information associated with a played audio message/vibration may be stored in step 510.

The information may also be sent to the co-browsing application 123/co-browse bot 124 for analysis in step 512. For example, the information may be used to identify better ways to train the contact center agents 131A-131N. The process then goes to step 504.

Figure 6:
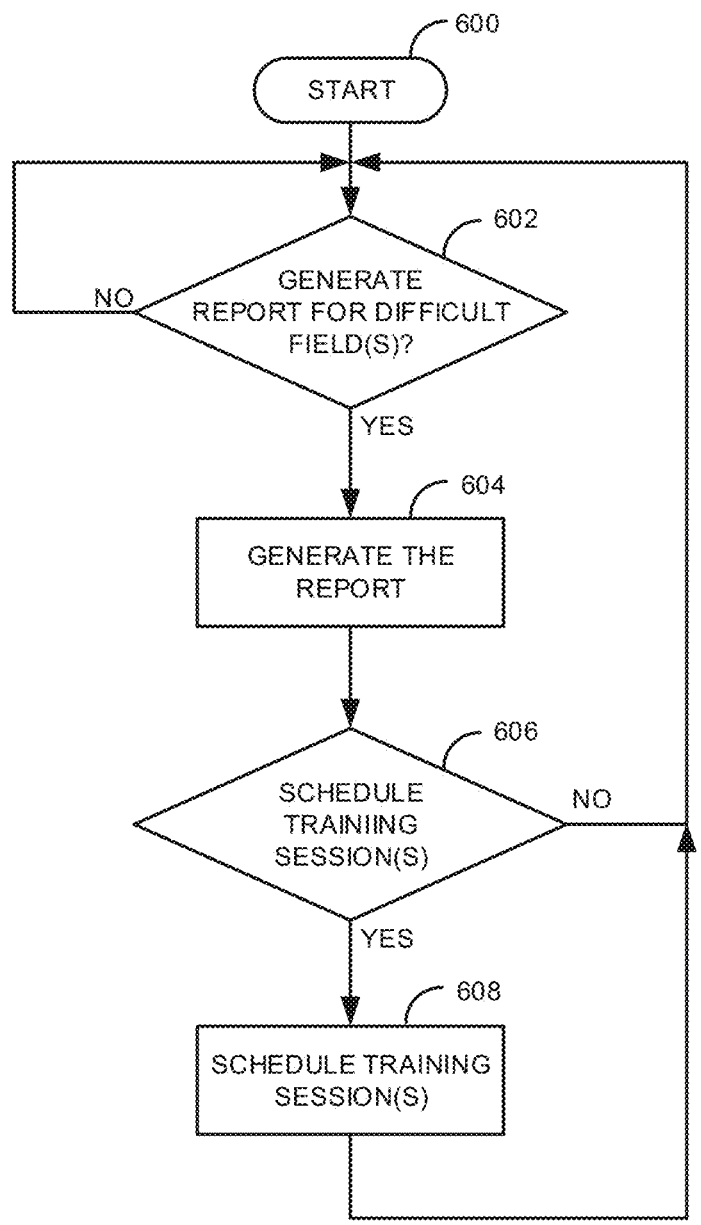
FIG. 6 is flow diagram of a process for generating a report for a co-browsing session.

FIG. 6 is flow diagram of a process for generating a report for a co-browsing session. The process starts in step 600. The co-browsing application 123 determines, in step 602, if a report needs to be generated for the identified difficult field(s) 201. A report may be generated for various reasons. For example, a report may be periodically generated, generated when a threshold/percentage of co-browse sessions identify a specific field 201 as being difficult to understand, and/or the like. The report is generated based on information associated with the field(s) 201 (e.g., the information stored in step 510) that are difficult to understand. For example, the report may be generated based on the field name, the customer name, a comment entered in the comment window 233, recorded audio, video, chat, keywords/phrases, audio/vibration information, and/or the like. The report may be generated based on auto-learning. For example, if the information shows a history of a specific fields 201 that customers 105 are having a problem with, a report may be generated with that indicates the specific problems being reported by the customers 105. If a report is not to be generated in step 602, the process of step 602 repeats.

Otherwise, if a report is to be generated in step 602, the co-browsing application 123 generates the report in step 604. The report may be generated and sent to an administrator in step 604. The report may be sent to a development/support group for the user interface 200 so that corrections may be made to the user interface 200.

The co-browsing application 123 determines, in step 606, if a training session is needed to better train the contact center agent(s) 131. For example, if the recoded conversation(s) indicates that the contact center agents 131 do not understand how to appropriately respond to the customer's questions, the co-browsing application 123 may determine, in step 606, to schedule a training session to address a specific problem. The co-browsing application 123 may determine, in step 606, that multiple training sessions are needed for specific topics. Specific contact center agents 131 may be identified for specific training sessions. An agenda of items may be identified based on different fields 201 that the customers 105 are having problems with. If a training session is not to be scheduled in step 606, the process goes to step 602. Otherwise, if a training session is needed in step 606, the co-browsing application 123 schedules the training session(s) in step 608. For example, the co-browsing application 123 may alert a supervisor and schedule the training session (e.g., in a calendaring application) based on an approval from the supervisor. The process then goes to step 602.

Figure 7:
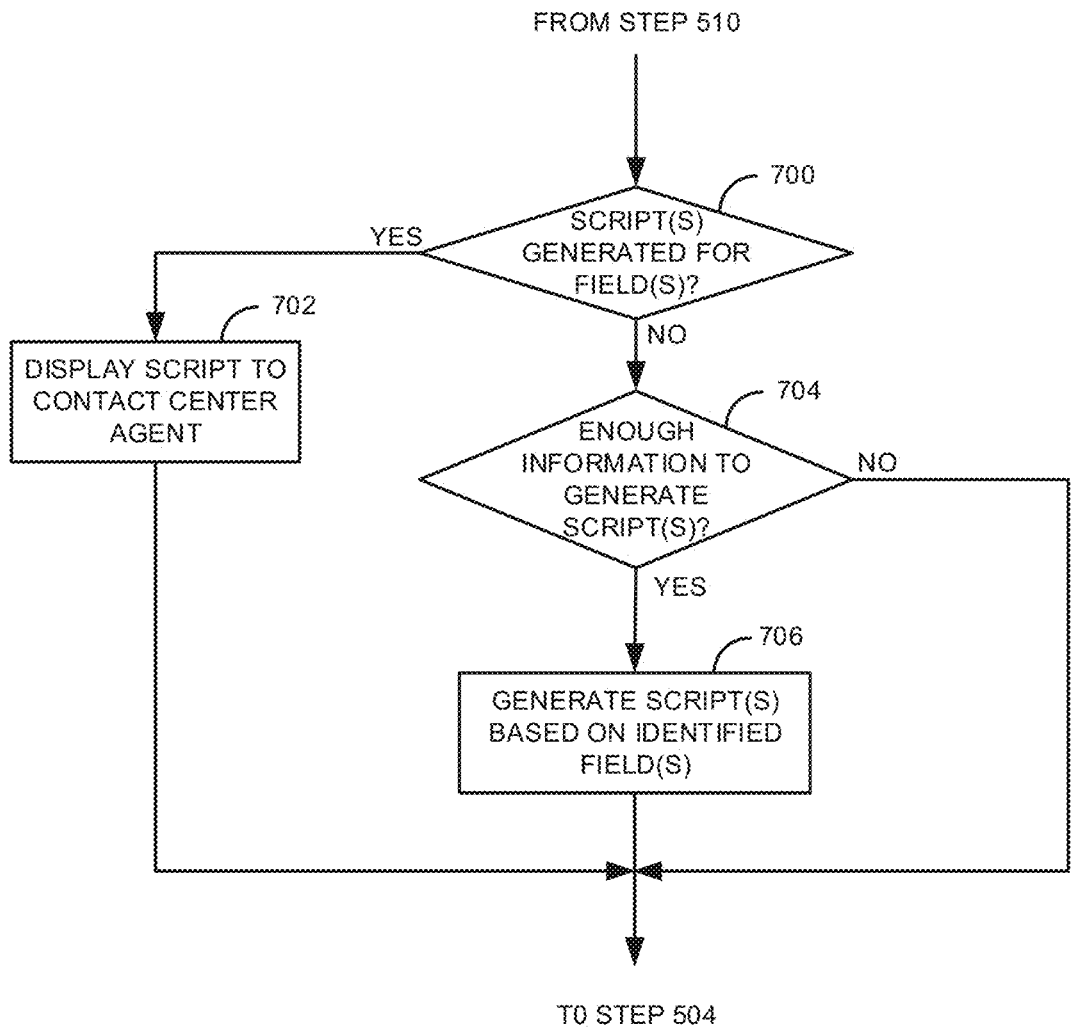
FIG. 7 is a flow diagram of a process for generating a script for a contact center agent in a co-browsing session.

FIG. 7 is a flow diagram of a process for generating a script for a contact center agent 131 in a co-browsing session. The process of FIG. 7 is an exemplary embodiment that goes between step 510 and step 504 of FIG. 5. After storing the information associated with the identified field(s) 201/recordings/key words/phrases/audio/vibration information in step 510, the co-browse bot 124, determines, in step 700 if a script has been generated for the identified field(s) 201. A script is used by the contact center agent 131 to better assist the customer 105 on how to use the identified field(s) 201. If a script has already been generated (i.e., based on prior co-browsing sessions) in step 700, the co-browse bot 124 displays, in step 702, the generated script to the contact center agent 131 to better assist the customer 105. For example, the script may identify previous problems that other customers 105 have had with the field(s) 201. The process then goes to step 504.

If a script has not been previously generated in step 700, the co-browse bot 124 determines, in step 704 if there is enough information to generate a script. For example, if there is only a single incident (out of hundreds of co-browsing sessions) with a field 201 that is difficult to understand, the co-browse bot 124 may determine that there is not enough information to generate a script for that particular field 201. If there is not enough information to generate the script in step 704, the process goes to step 504. Otherwise, if there is enough information to generate a script in step 704, the co-browse bot 124 generates the script(s) based on the identified field(s) 201 in step 706. The process then goes to step 504.

Although not shown in FIG. 7, once a script is generated, the script may be updated over time. For example, once a script is generated in step 700, if a new co-browsing session identifies the same field 201, the co-browse bot 124 may regenerate the script for display to the contact center agent 131 in step 702.

Figure 8:
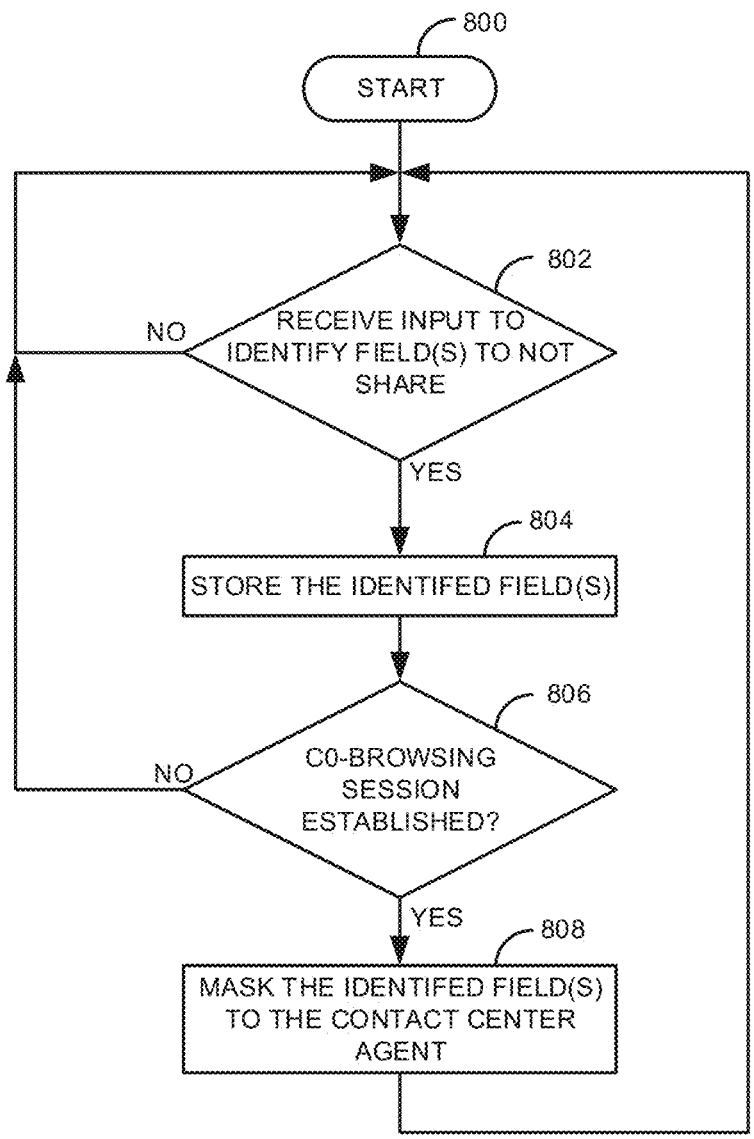
FIG. 8 is a flow diagram of a process for masking fields in a co-browsing session.

FIG. 8 is a flow diagram of a process for masking fields 201 in a co-browsing session (either before or after the co-browsing session starts). The process starts in step 802. The co-browsing application 123 determines, in step 802, if customer input is received to identify field(s) 201 not to share. For example, as shown in FIG. 4, the customer 105 has identified to not share the credit card number field 201C. If input is not received in step 802, the process of step 802 repeats.

Otherwise, if the input is received from the customer 105 to not share one or more fields 201 in step 802, the co-browsing application 123 stores the identified field(s) 201 in step 804. The communication manager 122 determines, in step 804, if a co-browsing session has been established. If a co-browsing session has not been established in step 806, the process goes back to step 802. Otherwise, if a co-browsing session has been established in step 806, the co-browsing application 123 masks, in step 808, the identified field(s) 201 to the contact center agent 131 in the co-browsing session. For example, in FIG. 4, the user interface 400 that is displayed to the contact center agent 131 would not include the credit card number field 201C. The field(s) 201 may be masked in various ways. For example, the credit card number field 201C may be empty or greyed out to not show the actual credit card number. The process then goes to step 802.

Figure 9:
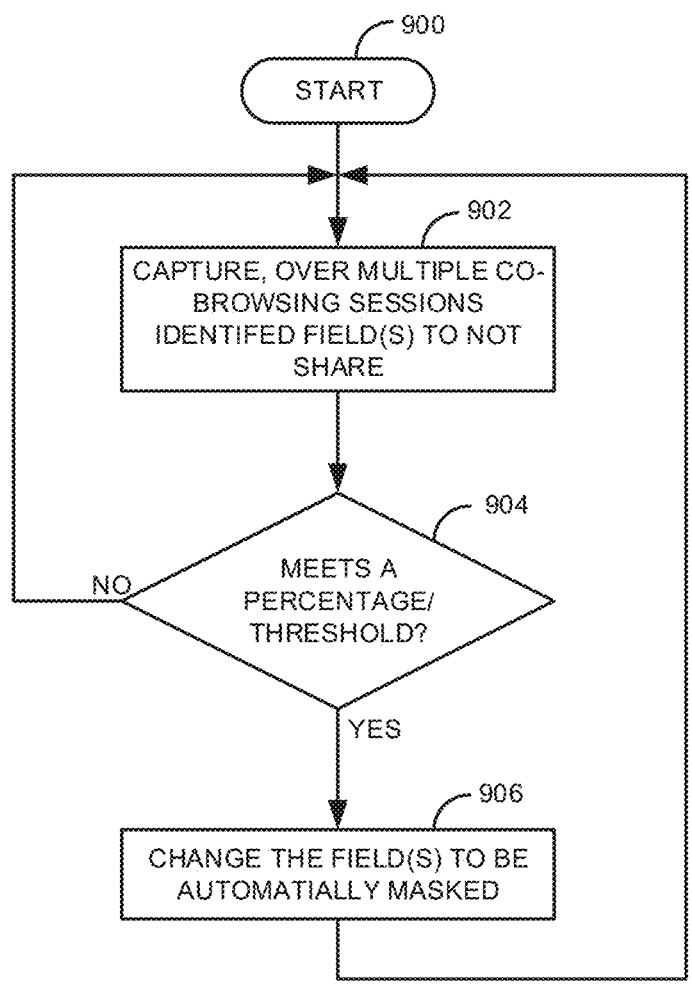
FIG. 9 is a flow diagram of a process for changing fields to be automatically masked in a co-browsing session.

FIG. 9 is a flow diagram of a process for changing fields 201 to be automatically masked in a co-browsing session. The process starts in step 900. The co-browsing application 123 captures, over multiple co-browsing sessions (e.g., 1000 co-browsing sessions), identified field(s) 201 not to share in step 902 (not the actual information in the field(s) 201. The co-browsing application 123 determines if a number of times a field 201 is identified (and/or a percentage) in the co-browsing sessions meets a threshold. For example, if in 50% of the 100 or more co-browsing sessions, the customers 105 want a particular field 201 masked, the co-browsing application 123 may determine that the threshold is met in step 904. If the threshold is not met in step 904, the process goes to step 902. Otherwise, if the threshold is met in step 904, the co-browsing application 123 changes the field 201 to be automatically masked in step 906. For example, the co-browsing application 123 may automatically mask the credit card number field 201C to the contact center agent 131 in all future co-browsing communication sessions. The process then goes to step 902.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102/121 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessor(s) 102/121), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor;
a memory;
a computer readable medium, coupled with the microprocessor and comprising microprocessor readable and executable instructions that, when executed by the microprocessor, cause the microprocessor to:
 establish a first co-browsing session between a first customer communication endpoint and a first agent terminal;
 receive first input, via at least one of the first customer communication endpoint and the first agent terminal, in the first co-browsing session, that identifies a field that is difficult to understand;
 store information associated with the identified field that is difficult to understand in the memory; and
 generate a report based on the stored information associated with the identified field that is difficult to understand.

2. The system of claim 1, wherein a bot receives input from a plurality of co-browsing sessions that identifies the field that is difficult to understand and wherein the microprocessor readable and executable instructions further cause the microprocessor to:
 automatically generate a script based on the input from that plurality of co-browsing sessions that identifies the field that is difficult to understand;
 receive second input, via a second co-browsing session between a second customer communication endpoint and a second agent terminal, that identifies the field that is difficult to understand; and
 generate for display the script in the second co-browsing session to a contact center agent using the second agent terminal.

3. The system of claim 1, wherein the first input comprises one or more of using a selection box, a text marking cursor, a text selection cursor, and a drag-and-drop to identify the field that is difficult to understand.

4. The system of claim 3, wherein the microprocessor readable and executable instructions further cause the microprocessor to:
 receive second input, via the first customer communication endpoint, in the first co-browsing session, that provides a comment as to why the identified field is difficult to understand;
 store the comment as to why the field is difficult to understand, wherein the report is generated based on the comment as to why the field is difficult to understand.

5. The system of claim 1, wherein the microprocessor readable and executable instructions further cause the microprocessor to:
 identify at least one of a keyword and a key phrase in at least one of an audio conversation and a chat conversation associated with the field that is difficult to understand, wherein the report is generated using the at least one of the identified keyword and the key phrase.

6. The system of claim 1, wherein the microprocessor readable and executable instructions further cause the microprocessor to:
 record at least one of an audio conversation and a chat conversation associated with the field that is difficult to understand, wherein the report is generated using the at least one of the recorded audio conversation and the chat conversation.

7. The system of claim 6, wherein the recording of the at least one of the audio conversation and the chat conversation associated with the field that is difficult to understand is taken from a full recording of the co-browsing session and wherein the recording of the at least audio conversation and the chat conversation is determined after the first input is received.

8. The system of claim 1, wherein the received first input is received based on an annotation window that allows a user to select how to identify the field that is difficult to understand.

9. The system of claim 1, wherein the microprocessor readable and executable instructions further cause the microprocessor to:

automatically schedule a training session based on the generated report associated with the identified field that is difficult to understand.

10. The system of claim 1, wherein the received input identifies at least one of an audio message and a vibration played during the co-browsing session.

11. A method comprising:
establishing, by a microprocessor, a first co-browsing session between a first customer communication endpoint and a first agent terminal;
receiving, by the microprocessor, first input, via at least one of the first customer communication endpoint and the first agent terminal, in the first co-browsing session, that identifies a field that is difficult to understand;
storing, by the microprocessor, information associated with the identified field that is difficult to understand in a memory; and
generating, by the microprocessor, a report based on the stored information associated with the identified field that is difficult to understand.

12. The method of claim 11, wherein a bot receives input from a plurality of co-browsing sessions that identifies the field that is difficult to understand and further comprising:
automatically generating a script based on the input from that plurality of co-browsing sessions that identifies the field that is difficult to understand;
receiving second input, via a second co-browsing session between a second customer communication endpoint and a second agent terminal, that identifies the field that is difficult to understand; and generating for display, the script in the second co-browsing session to a contact center agent using the second agent terminal.

13. The method of claim 11, wherein the first input comprises one or more of using a selection box, a text marking cursor, a text selection cursor, and a drag-and-drop to identify the field that is difficult to understand.

14. The system of claim 13, further comprising:
receiving second input, via the first customer communication endpoint, in the first co-browsing session , that provides a comment as to why the identified field is difficult to understand;
storing the comment as to why the field is difficult to understand, wherein the report is generated based on the comment as to why the field is difficult to understand.

15. The method of claim 11, further comprising:
identifying at least one of a keyword and a key phrase in at least one of an audio conversation and a chat conversation associated with the field that is difficult to understand, wherein the report is generated using the at least one of the identified keyword and the key phrase.

16. The method of claim 11, further comprising:
recording at least one of an audio conversation and a chat conversation associated with the field that is difficult to understand, wherein the report is generated using the at least one of the recorded audio conversation and the chat conversation.

17. The method of claim 16, wherein the recording of the at least one of the audio conversation and the chat conversation associated with the field that is difficult to understand is taken from a full recording of the co-browsing session and wherein the recording of the at least audio conversation and the chat conversation is determined after the first input is received.

18. The method of claim 11, wherein the received input identifies at least one of an audio message and a vibration played during the co-browsing session.

19. A system comprising:
a microprocessor;
a memory; and
a computer readable medium, coupled with the microprocessor and comprising microprocessor readable and executable instructions that, when executed by the microprocessor, cause the microprocessor to:
receive first input, via the first customer communication endpoint, that identifies a field that a customer does not want shared in a first co-browsing session;
establish the first co-browsing session between a first customer communication endpoint and a first agent terminal;
masking the identified field that the user does not want shared in the first co-browsing session;
receive input from a plurality of co-browsing sessions, wherein at least one of a percentage and a number of the plurality of co-browsing sessions identifies the field that the user does not want shared in the first co-browsing session; and
changing the identified field to be automatically masked in any future co-browsing sessions based on the at least one of the percentage and the number of the plurality of co-browsing sessions that identify the field that the user does not want shared.

20. The system of claim 19, wherein the microprocessor readable and executable instructions further cause the microprocessor to:
receive a second input, via at least one of the first customer communication endpoint and the first agent terminal, in the first co-browsing session, that identifies a field that is difficult to understand;
store information associated with the identified field that is difficult to understand in the memory; and
generate a report based on the stored information associated with the identified field that is difficult to understand.

* * * * *